US006867423B2

(12) United States Patent
Warner

(10) Patent No.: US 6,867,423 B2
(45) Date of Patent: Mar. 15, 2005

(54) METHOD AND APPARATUS FOR VISUALLY INSPECTING A SUBSTRATE ON A PRINTING PRESS

(75) Inventor: Paul Warner, Germantown, WI (US)

(73) Assignee: Quad/Tech, Inc., Sussex, WI (US)

( * ) Notice: Subject to any disclaimer, the term of this patent is extended or adjusted under 35 U.S.C. 154(b) by 99 days.

(21) Appl. No.: 10/245,469

(22) Filed: Sep. 17, 2002

(65) Prior Publication Data

US 2004/0051061 A1 Mar. 18, 2004

(51) Int. Cl.[7] .......................... G01N 21/86; G01V 8/00

(52) U.S. Cl. .......................... 250/559.29; 250/559.45; 271/226

(58) Field of Search .......................... 250/559.29, 559.3, 250/559.37; 271/226–227, 233–234, 242–245

(56) References Cited

U.S. PATENT DOCUMENTS

| | | | | | |
|---|---|---|---|---|---|
| 4,685,139 | A | | 8/1987 | Masuda et al. | |
| 4,882,764 | A | | 11/1989 | Reynolds et al. | |
| 4,885,785 | A | | 12/1989 | Reynolds et al. | |
| 5,331,394 | A | | 7/1994 | Shalon et al. | |
| 5,604,821 | A | | 2/1997 | Ranganathan et al. | |
| 5,724,259 | A | | 3/1998 | Seymour et al. | |
| 5,777,878 | A | * | 7/1998 | Helmrich et al. | 700/124 |
| 5,880,460 | A | | 3/1999 | Merrill | |
| 5,926,214 | A | | 7/1999 | Denyer et al. | |
| 5,969,750 | A | | 10/1999 | Hsieh et al. | |
| 6,035,077 | A | | 3/2000 | Chen et al. | |
| 6,064,759 | A | | 5/2000 | Buckley et al. | |
| 6,067,421 | A | | 5/2000 | Kitazawa et al. | |
| 6,101,287 | A | | 8/2000 | Corum et al. | |
| 6,111,245 | A | | 8/2000 | Wu et al. | |
| 6,115,066 | A | | 9/2000 | Gowda et al. | |
| 6,127,697 | A | | 10/2000 | Guidash | |
| 6,133,954 | A | | 10/2000 | Jie et al. | |
| 6,456,733 | B1 | | 9/2002 | Miyauchi et al. | |
| 6,521,906 | B1 | * | 2/2003 | Beying et al. | 250/559.37 |
| 6,618,084 | B1 | * | 9/2003 | Rambaldi et al. | 348/247 |
| 6,750,466 | B2 | | 6/2004 | Guha et al. | |

OTHER PUBLICATIONS

DVT Corporation, DVT Introduces World's Smallest Machine Vision Sensor, Press Release on Internet, Jun. 1, 2001, DVT Corporation, Norcross, Georgia.

DVT Corporation, DVT Corporation Introduces World's Fastest Machine Vision Sensor, Press Release on Internet, Jul. 31, 2001, DVT Corporation, Norcross, Georgia.

* cited by examiner

*Primary Examiner*—Stephone B. Allen
*Assistant Examiner*—Patrick J. Lee
(74) *Attorney, Agent, or Firm*—Michael Best & Friedrich LLP

(57) ABSTRACT

The present invention relates generally to the field of printing presses, and specifically to a method and apparatus for visually inspecting a web moving on a printing press using a CMOS based image recording device and preferably a LED light source.

12 Claims, 4 Drawing Sheets

METHOD AND APPARATUS FOR VISUALLY INSPECTING A SUBSTRATE ON A PRINTING PRESS

BACKGROUND OF THE INVENTION

The present invention relates generally to the field of printing presses, and specifically to a method and apparatus for visually inspecting images on a substrate moving along a printing press using a complementary metal oxide semiconductor ("CMOS") based image recording device and/or a light emitting diode ("LED") illumination source.

In an exemplary printing press such as a web offset press, a web of material, typically paper, is fed from a storage mechanism, such as a reel stand, to one or more printing units that imprint the web with repetitive images. The imprinted web is typically driven through a number of processing units such as a dryer unit, a chill stand, and/or a coating machine. The web is then fed to a former/folder.

Various conditions of the printing press (e.g., web tension, presence of splices, and influence from folders, slitters, imprinters, gluers, and other processing equipment) may cause the position of the web to vary over time with respect to the processing stations (i.e., printing units, processing units, former/folder, etc.). Accordingly, it is necessary to periodically adjust the positional relationship of the web and the processing stations by advancing or retarding the longitudinal position of the web and/or adjusting the lateral position of the web.

Control systems that control the adjustment of the positional relationship of the web and the processing stations are generally known and include cutoff control. Typically, the amount of positional adjustment is determined by observing the movement of the web using a visual inspection system and/or using a printing press operator manually observing the web. Other printing press control systems include color registration, color control and web inspection.

Existing visual inspection systems that operate in conjunction with control systems typically utilize at least one camera assembly. Camera assemblies typically include an image recording device, such as a charge-coupled device ("CCD") camera. The camera assemblies also typically include an illumination system for illuminating the field of view of the image recording device when an image is being recorded. Existing illumination systems include a light source such as a pulsed xenon strobe light and/or an incandescent light.

Generally, each camera assembly used in a visual inspection system is coupled to a dedicated processing unit (i.e., each processing unit accommodates only a single camera assembly) that is thereby coupled to a control system used to control an aspect of the printing press. At least a portion of the control system may be included in the dedicated processing unit. Technical requirements of the existing visual inspection systems generally necessitate that the interconnection that couples a camera assembly to the dedicated processing unit is less than a maximum fifteen foot distance. Existing camera assemblies are typically synchronized to the traveling web using a series of shaft encoders. Existing camera assemblies do not include the ability to record every revolution or iteration of the traveling web (i.e., the camera assemblies do not include sampling rates that are high enough to record at least a portion of an image printed on the traveling web), and thus existing camera assemblies rely on sampling techniques to analyze the traveling web for movement. Existing visual inspection systems cannot detect variation in the position of the web in any direction that is not in the same plane as the primary web movement.

The light sources utilized in the illumination system of existing visual inspection systems generally produce heat that must be dissipated to reduce adverse effects from the heat on the image quality (e.g., reduced image quality due to lens distortion). Additionally, the light sources would preferably use less power, cost less, and last longer.

SUMMARY OF THE INVENTION

The invention provides a visual inspection system for a printing press that visually inspects a substrate moving on a printing press using a CMOS based image recording device. The visual inspection system of the present invention provides a higher level of functionality at less expense than existing visual inspection systems. The visual inspection system of the present invention can be implemented in new and existing printing presses to perform visual inspection of the substrate for control systems utilized in a number of different applications, e.g., ribbon or web control including side lay control, print-to-cut control, print-to-fold control, print-to-process control, color registration, color control, web inspection, or any other application where visual inspection of the substrate is desired.

The invention further provides a LED light source for illuminating the substrate.

Other features and advantages of the present invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION OF THE PREFERRED EMBODIMENT

Figure 1:
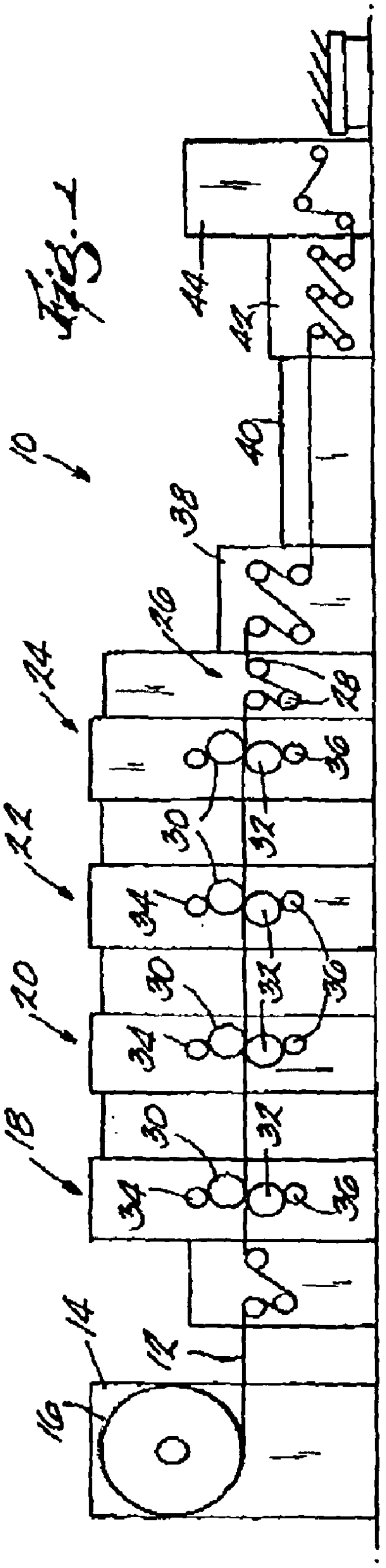
FIG. 1 is a schematic diagram of a representative web offset printing press.

Referring to FIG. 1, a representative printing press 10 for printing a number of repetitive images upon a substrate such as web 12 (e.g., paper) is illustrated. The printing press 10 illustrated is a web offset press that includes a reel stand 14 that supports a reel 16 of the web 12. It should be noted that the invention is equally applicable to sheet fed presses and other non-offset presses such as gravure presses and newspaper presses for example.

The printing press 10 includes printing units 18, 20, 22, and 24, each of which prints in a different color ink. This type of printing is commonly referred to as web offset printing. In the illustrated printing press 10, the first printing unit 18 encountered by the web 12 prints with black ink and the other printing units 20, 22 and 24 print with other colors. For example, the printing unit 20 may print in magenta ink, the printing unit 22 may print in cyan ink, and the printing unit 24 may print in yellow ink. It should be understood, however, that the invention is capable of being carried out with printing units that print in different colors, and/or with fewer or additional printing units. The printing press 10 includes a drive system 26, including drive rollers 28, that moves the web 12 from the reel 16 through each of the printing units 18, 20, 22, and 24. The images printed by each of the printing units 18, 20, 22 and 24 overlap to create composite multi-color images on the traveling web 12.

Each printing unit 18, 20, 22, and 24 includes a pair of parallel rotatable blanket cylinders 30 and 32 that nip the web 12. Each printing unit 18, 20, 22, and 24 further includes a plate cylinder 34 which has a printing plate thereon, and which applies an ink image to the blanket cylinder 30. Optionally, if it is desired to print both sides of the web 12, each printing unit 18, 20, 22, and 24 will further include a plate cylinder 36 which has a printing plate thereon, and which applies an ink image to the blanket cylinder 32. The blanket cylinders 30 and 32 transfer the ink images, received from the plate cylinders 34 and 36, to the web 12.

After exiting the printing stations 18, 20, 22, and 24, the web 12 is guided through various processing units as desired, such as a dryer 38, a chill stand 40, and a coating machine 42. The web is then fed to a former/folder 44.

Figure 2:
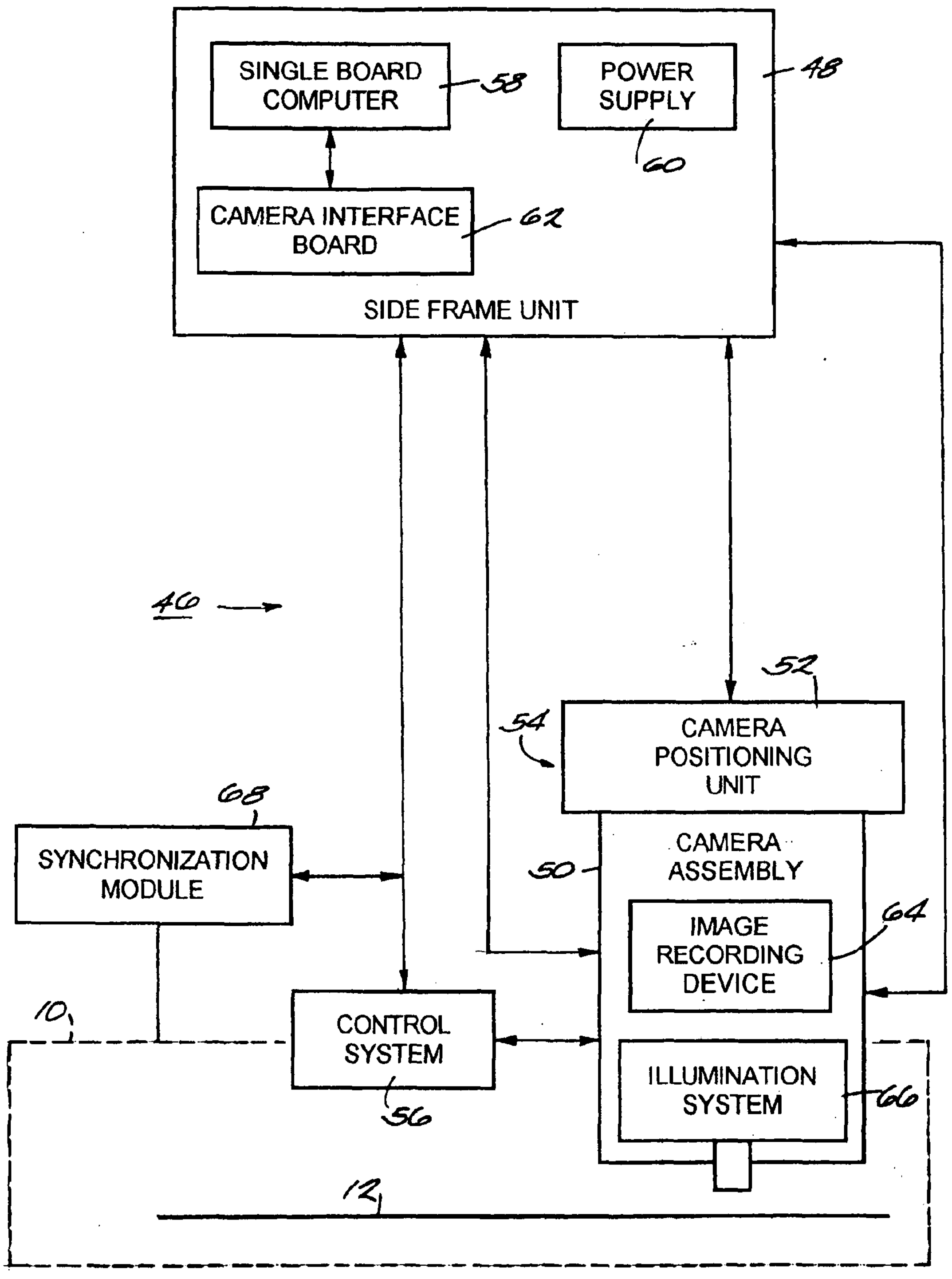
FIG. 2 is a block diagram of a visual inspection system in accordance with the present invention.

Automated web-fed printing presses generally include at least one camera assembly in optical communication with the web 12. Each camera assembly is utilized to observe the web for a representative control system of the printing press. The printing press 10 is coupled to at least one visual inspection system. As illustrated in FIG. 2, a visual inspection system 46 of the present invention includes a side frame unit 48 (i.e., processing unit) and at least one camera assembly 50 configured to be in optical communication with the web 12. The visual inspection system 46 may also include at least one camera assembly positioning unit 52. The combination of a camera assembly 50 and a camera assembly positioning unit 52 is also known as a camera system 54.

A camera assembly positioning unit 52 is not necessary if, for example, a single camera assembly 50 or a plurality of cooperating cameras assemblies 50 obtain a field of view that covers all required areas of the web 12. Each camera assembly 50 and/or camera system 54 included in the visual inspection system 46 is mounted on the printing press 10 to obtain a field of view of the web 12 in an area that requires visual inspection. The visual inspection system 46 allows for future alteration of both the number and the placement of camera assemblies 50 and/or camera systems 54.

The side frame unit 48 includes at least one interconnection to each camera assembly 50 used and at least one interconnection to each camera assembly positioning unit 52 used. The interconnections must be less than the maximum distance allowed by the low-voltage differential transmitters and receivers utilized to facilitate the transfer of information. When a non-multiplexed transmission protocol is used for the transfer of information, the interconnection can be approximately 300 feet. When a multiplexed transmission protocol is used for the transfer of information, the interconnection can be approximately 30 feet. A non-multiplexed transmission protocol is used in the preferred embodiment. In one embodiment, the cabling used for the interconnections is rated for high frequency transmissions.

A single side frame unit 48 can preferably accommodate up to, for example, eight camera assemblies 50 during steady state operation of the printing press 10. Additionally, the side frame unit 48 can be located up to 1000 feet from control systems 56 and decision electronics of the printing press 10. In one embodiment, the side frame unit 48 is coupled to each of the control systems 56 and the decision electronics via an Ethernet connection. The invention allows for increased flexibility in mounting of the components of the visual inspection system 46 based upon the capacity of the side frame unit 48, the extended distances of the interconnections, and a camera assembly 50, which is reduced in sized compared to existing camera assemblies, based upon the components utilized and the design incorporated.

The side frame unit 48 may include a single-board computer ("SBC") 58, a power supply 60, and at least one camera interface board ("CIB") 62. Each camera interface board 62 is coupled to the single board computer 58 via a bus connector located on the single board computer 58. Each camera interface board 62 can be coupled to either one or a plurality of camera assemblies 50. Each camera interface board 62 can be coupled to each camera positioning unit 52 that is adapted to move the respective camera assembly 50 coupled to the camera interface board 62.

The single board computer 58 may be of a conventional type including a Pentium or higher processor with a clock speed of at least 330 MHz, a personal computer ("PC") architecture, a peripheral component interconnect ("PCI") (i.e., a personal computer bus), approximately 32 MB of memory (semiconductor memory and/or disk drive storage), and an Ethernet port. Optionally, the single board computer 58 may include an integrated drive electronics ("IDE") (i.e., hard disk) controller, a video graphics array ("VGA") driver, and a keyboard input. The amount of memory required is predominately a function of the amount of historical data that is stored. If only limited historical data is desired, the memory requirement can be kept low. The single board computer 58 may be configured to allow for remote software uploads and remote system diagnostics.

Each camera assembly 50 includes an image recording device 64 and preferably an illumination system 66. In the preferred embodiment, the image recording device 64 is a CMOS based image recording device (e.g., CMOS camera and/or CMOS sensor) such as model MCM 20014 available from Motorola, or other similar devices from other manufactures. Advantages of a CMOS based image recording device include lower power consumption, reduced data transmission requirements, and directly modifiable acquisition parameters on a single integrated chip.

Figure 3:
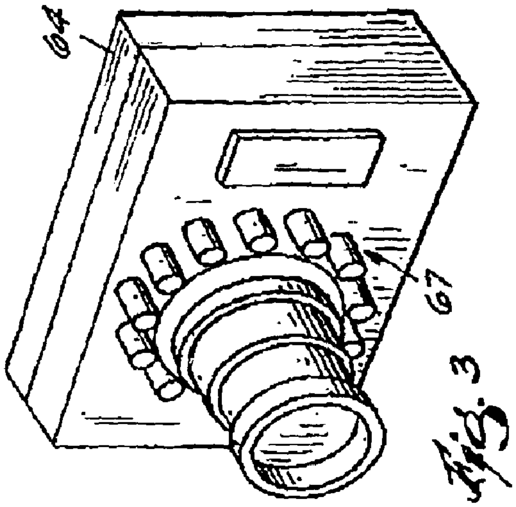
FIG. 3 is a perspective view of a LED light array encircling the lens of an image recording device.

The illumination system 66 includes a light source to illuminate the field of view. In the preferred embodiment, the light source is an LED light array, and more preferably, a plurality of high intensity LEDs. Such LEDs are available as model LXHL-PH01 from LumiLeds, or other similar devices from other manufactures. The LED light array 67 preferably incorporates a pattern or configuration located around the lens of the image recording device 64 such as the circular configuration shown in FIG. 3. However, it should be noted that other configurations or patterns can also be utilized such as a rectangular configuration. The use of a non-strobe and non-incandescent light source, such as the LEDs, generates less heat, costs less, uses less power and has a longer life as compared to strobe and incandescent light sources. However, it should be noted that strobed LEDs and incandescent light sources can be utilized with the present invention With reference back to FIG. 2, the visual inspection system 46 is preferably synchronized with the movement of the web 12 with a synchronization module 68. The synchronization module 68 is coupled to the printing press 10 such that a transition is detected upon each major revolution of the web 12 passing by (e.g., a transition is detected for each image repeat). The visual inspection system 46 utilizes the transitions to generate an internal timing that results in recordation of an image of at least a portion of each and every image repeat passing by the camera assembly 50.

The visual inspection system 46 utilizes at least one synchronization module 68. Generally, each control aspect of the printing press 10 that is being monitored includes a dedicated synchronization module 68. In an alternative embodiment, the signal from the synchronization module 68 may be multiplexed together or daisy chained for use by a number of control applications. The present invention allows for synchronization of the visual inspection system 46 with an external stimulus operating at rates in excess of thirty frames per second. Thus, the visual inspection system 46 can record at least a portion of every image repeat passing by a camera assembly 50 on a printing press 10 running at rates of speed in excess of 3500 feet per minute with a 22.5 inch repeat rate. Additionally, the visual inspection system 46 can synchronize with an external stimulus over a range of rates with the typical range falling between five frames per second and thirty frames per second.

The synchronization module 68 may include a shaft encoder that contains a top-dead-center ("TDC") indication as well as 1000–8000 divisions indicating minor gradations of position. Alternatively, the synchronization module 68 may include a shaft encoder that contains only a TDC indication. The preferred embodiment utilizes a shaft encoder that contains only a TDC indication. The TDC only method may allow for almost jitter free indication of the crossing of the next repeat. Both methods divide the time between transitions into enough pieces to allow accurate positioning. The visual inspection system 46 then counts the time from the latest transition and automatically provides a control signal to the camera assembly 50 indicating the correct time to record the image.

In general operation, the side frame unit 48 is coupled to the camera assembly positioning units 52 and the camera assemblies 50 by a number of interconnections (e.g., data buses). The side frame unit 48 sends control signals to the camera assembly positioning unit 52 which moves the camera assembly 50 to a position over the web 12 based on control signals and an encoder input. In one embodiment, the camera assembly positioning unit 52 is configured to move the camera assembly 50 to any X coordinate within a predetermined area based on the mechanical limitations of the camera assembly positioning unit 52 (e.g., mounting location and length of travel in each direction) and to a Y-coordinate based on the encoder input. Although positioning of the camera assembly 50 is automatic, positioning can be overridden by an operator of the printing press 10 if the operator wishes to manually position the camera assembly 50. It should be noted that each camera assembly 50 can also remain stationary relative to the web.

The side frame unit 48 also sends control signals to the image recording device 64 and the illumination system 66. When the control signals include a request to acquire an image, the web 12 is illuminated by the illumination system 66 and the image recording device 64 simultaneously records image data that is representative of at least a portion of the printed image within the field of view of the image recording device 64. More specifically, an image of the web 12 is recorded by first enabling a few of the rows of pixels and exposing their cells to light, and then, after a short time (which is based on the shutter speed of the image recording device 64), an image of those pixels is recorded and the next set of rows is enabled. This process continues until all rows of the requested image are recorded. The image recording device 64 can record a representation of at least a portion of the web 12 within the field of view instead of only a single point or a single line of information as is recorded when using existing image recording devices.

Properties of the image recording device 64 allow for the start and end X-Y dimensions of the image to be controlled to allow for precise image recording. If the web 12 moves so that the start and end X-Y dimensions of the image that is intended to be recorded next cannot include the object of interest (i.e., the object of interest is outside the field of view of the image recording device 64), then the camera assembly 50 is repositioned by the camera assembly positioning unit 52 as discussed above so the object of interest is within the start and end X-Y dimensions of the image to be recorded.

In one embodiment, the image recording device 64 is initialized using inter-integrated circuit ("12C") messaging lines and following an 12C protocol. Various registers in the image recording device 64 allow for full control of the processes of the image recording device 64. The registers most often utilized (at times other than initialization) include a shutter speed register, a column gain register, and a window size register.

The window size register allows the size of the image to be set. The size of the image can be set to be all, or any portion thereof, of the field of view of the image recording device 64. If the size of the image is set to be only a portion of the field of view, the image can be set to occupy any X-Y coordinates of that field of view. However, the size of the image needs to be set to a size sufficient to allow for continuous monitoring of the desired portion of the web 12 over normal speed variations and synchronization jitter.

The shutter speed register of the image recording device 64 is set to optimize the image recording at various speeds of the printing press 10. The shutter speed is fast enough to totally stop motion at rates of speed in excess of 3500 feet per minute (i.e., the web may travel at rates of speed in excess of 3500 feet per minute). Additionally, the shutter speed of the CMOS image recording device is variable to generate exposure times in a range of one micro second to one second. In one embodiment, a single shutter speed setting may be used for a wide range of printing press speeds.

The column gain register of the image recording device 64 is used to balance color gain for the color temperature of the illumination system 66. As discussed above, dependent upon what type of light source is used, heat generation may cause distortion of the recorded image. Adjustment of the column gain register adjusts for this. The LED light array 67 generates less heat than existing light sources and therefore reduces correction of any distortion that may occur due to that heat generation. Additionally, the image analysis algorithms used by the side frame unit 56 can further reduce the adverse effects of heat. Values for all of the registers are preloaded at startup and only changes in the register values need to be loaded at run time. The values can be placed in a database for initialization purposes.

After an image is recorded by the image recording device 64, the recorded image is transferred to the side frame unit 48. Each of the sets of rows of data may be transferred as subsequent rows are being recorded. The recorded image (or part thereof) may be transferred via a direct memory access ("DMA") from the image recording device 64 to the side frame unit 48, or in another embodiment, the image recording device 64 and the side frame unit 48 may share a "foreign" memory and the transfer is therefore performed internal to that memory. The amount of image data transferred depends upon the physical size of the recorded image. The side frame unit 48 may include several megabytes of storage space (i.e., a buffer) reserved for each camera assembly 50 coupled thereto. The buffer is used in a circular form so that several recorded images are available to the side frame unit 48 after the first several recorded images are transferred. Once the buffer is full, new image data is saved over the "oldest" image data in the buffer. In one embodiment, the image data may be transferred to other memory after analyzed to allow for future historical analyses. In another embodiment, the size of the buffer may be large enough to allow for the historical analyses.

Once the side frame unit 48 receives the recorded image, the recorded image is processed according to what control aspect in being analyzed. In the example set forth below, cutoff control in the folder is being controlled. The side frame unit 48 is able to recognize a pattern of marks (e.g., a diamond, a triangle, or any other pattern) in addition to the single mark and the linear train of marks that existing camera assemblies can recognize. This ability allows the visual inspection system 46 to detect variation in the position of the web in both the lateral and the circumferential directions. Control system 56, cutoff control in this example, can therefore be used to control adjustment of the web in the same plane as, as well as in planes other than, the direction of the primary movement of the web 12. Additionally, the pattern of marks which the visual inspection system 46 recognizes may be part of the image rather than marks printed on the web 12 specifically for the purpose of detecting web movement. The ability to recognize parts of the image normally produced reduces problems associated with placement of these special marks on the web (e.g. in a fold or in an area that is to be cut off for waste).

The side frame unit 48 is configured to analyze a recorded image for consistency and is also configured to determine a position of components of the recorded image to within 0.001 of an inch in both the lateral and the circumferential directions. The analysis techniques may incorporate mathematical and/or geometrical image analysis algorithms. Generally, a number of algorithms can be used in a single side frame unit 48 to allow for use of the visual inspection system 46 in a number of modes (e.g., initialization, steady state operation, shut down). Using these mode specific algorithms allows the visual inspection system 46 to lock onto a pattern of marks in less than three seconds when the web 12 is traveling at approximately 300 feet per minute at printing press 10 startup.

In this cutoff control example, the analysis begins by locating light and/or dark transitions in the body of the recorded image. After a pattern of at least three light and/or dark transitions is located, the pattern is compared to prior sets of data to determine if there has been any shift in the traveling web. Any number of sets of marks and/or patterns may be loaded into the side frame unit 48 for comparison to the marks or patterns from the recorded image. Any shift detected is quantified using the resolution of the synchronization module 68 information (e.g., TDC transition) and the camera positioning unit 52. The side frame unit 56 can calculate the X-Y coordinates of the reference mark or pattern by determining how fast the web 12 is traveling and how much time has passed since the last known X-Y position was determined. The side frame unit 56 generates an error for each camera assembly it is analyzing and transmits the resulting circumferential and lateral errors to the representative control systems 68. This information is then used to control the necessary adjustments to the positional relationship of the web 12 and the processing stations.

The side frame unit 48 builds a history of happenings and analyzes that history for patterns of variation in the positional relationship of the web 12 and the processing stations. If a period for a pattern in the error tracking is determined, the side frame unit 48 is configured to apply these periods to a "look ahead" analysis to provide error correction of projected upcoming events. In another embodiment, data is stored for off-line analysis that may provide insight in how to modify the algorithms to better analyze the image data. These types of analyses increase the overall memory requirements of the side frame unit 48.

In another example, the visual inspection system 46 is utilized in conjunction with a closed-loop ribbon or web control system. Generally, all web up configurations of the former/folder are stored in a memory. Additionally, ribbon control system setup information is also stored in a memory. Such information includes camera mapping (camera assembly 50 to compensator and camera assembly 50 to angle bar relationships for all ribbons contained in the setup), synchronization module 68 timing, web widths and locations, and various other information relative to the performance tuning of the ribbon control system.

At printing press startup, a folder preset system presets the ribbon compensators and angle bars. The ribbon control system's side lay function then moves each ribbon (a system may include between 2 and 24 ribbons) to an exact start position. Movement to the exact start location is accomplished by visually inspecting a specified edge of each ribbon using the visual inspection system 46. Typically, a camera assembly 50 is mounted to view each of the ribbons. The visual inspection system 46 locates a mark or pattern and the ribbon control system then calculates the absolute position of the ribbon edge based on the width of the ribbon and the X-Y coordinates of the mark or pattern provided by the visual inspection system 46. As soon as the ink on the web 12 is stable, the camera assembly 50 is positioned in the alley where the mark or pattern is to be located.

If the ribbon control system is utilizing mark recognition, the visual inspection system 46 begins to search out the mark by recording images based upon the timing provided by the synchronization module 68. Once the mark is located, the ribbon control system then adjusts the print-to-cut register and also fine tunes the print-to-fold register. The invention is configured to locate a mark in two plate revolutions providing the ink is visible and the camera assembly is positioned over the alley.

As discussed above, if a pattern recognition in the web 12 is desired, the present invention is configured to locate a pattern within three seconds of startup of the printing press 10 if the web 12 is traveling at a speed of approximately 300 feet per minute.

The ribbon control system preferably includes a job configuration library which can be used to call up a job without having to enter all of the setup parameters. If the job is stored in the job configuration library, the printing press 10 is initialized by selecting a job from the job configuration library, verifying the settings of the job, adjusting the settings if necessary, and placing the system in automatic mode. The visual inspection system 46 then takes over the observation of the web movement when the printing press 10 is in automatic mode.

If a job that needs to be run is not in the job configuration library, the printing press operator may need to perform numerous tasks including definition of camera mapping, determination of angle bar ribbon wrap direction to establish motor output polarity, determination of compensator ribbon wrap direction to establish motor output polarity, selection of at least one synchronization module 68 for use, and determination of the ribbon width and offset for each ribbon before the printing press 10 can be placed into automatic mode. Additional tasks may be required before the printing press 10 is placed into automatic mode, the number depending upon whether a mark recognition or pattern recognition is utilized.

Figure 4:
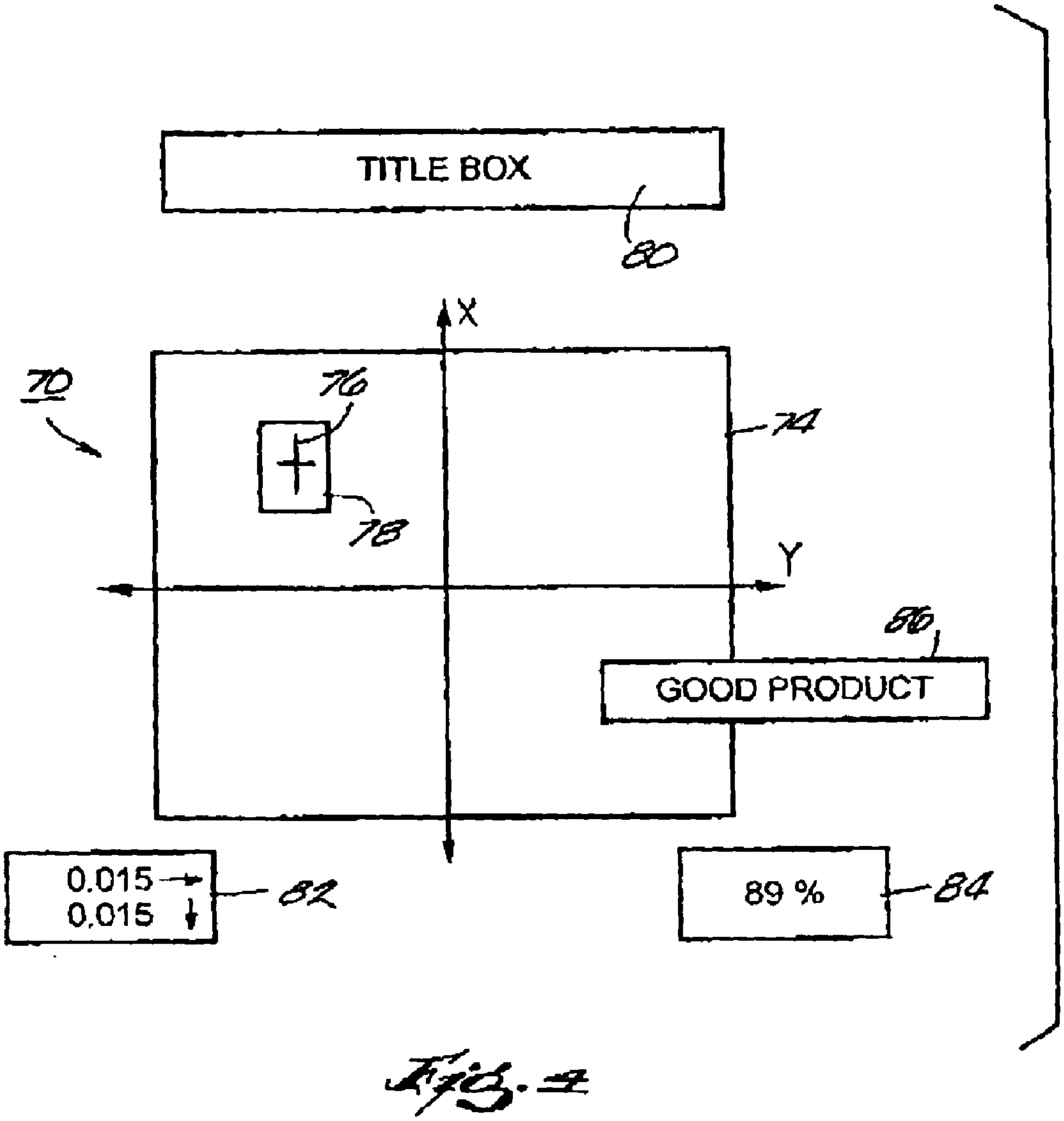
FIG. 4 is an exemplary run screen.
Figure 5:
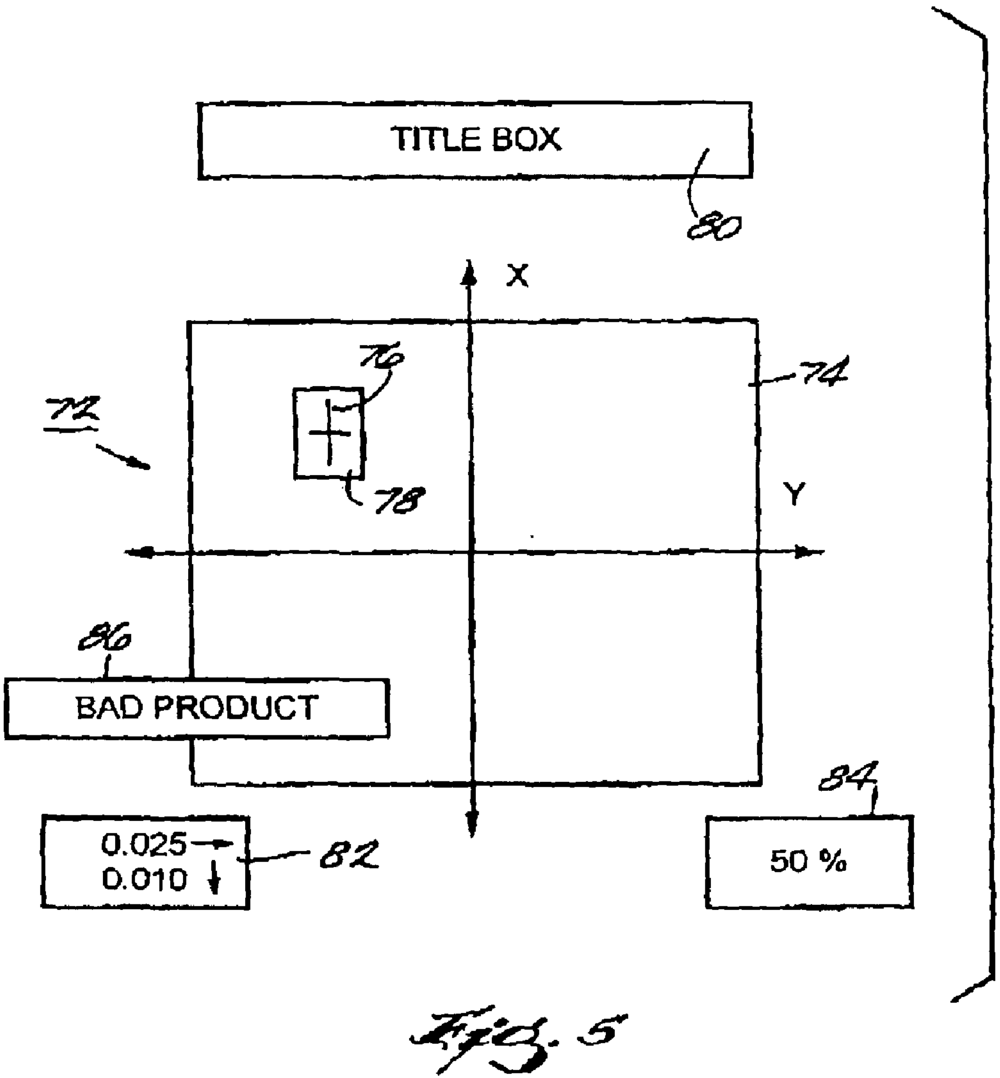
FIG. 5 is an exemplary run screen.

Turning now to FIGS. 4 and 5, these drawings illustrate two representative run screens 70 and 72, respectively, that are viewable by an operator of the printing press 10. The run screens 70 and 72 may be used to observe print-to-cut and print-to-fold operations. In other embodiments, similar run screens may be utilized to observe web movement for other applications. The run screens 70 and 72 include an X-Y axis that includes an acceptable range of operation 74. In one embodiment, the acceptable range 74 is green when the product being produced is considered good product, and the acceptable range 74 is red when the product being produced is considered bad product. A cross hair pointer 76 indicates the X-Y coordinates of the pattern or mark being analyzed. A standard deviation monitor box 78 illustrates the error typically associated with the algorithm used to analyze the pattern or mark. The run screens can be configured to include a title box 80, an error correction amount box 82, a pattern recognition level box 84, and a status box 86. The title box 80 may indicate what the run screen is representative of (e.g., ribbon number two of a twenty-four ribbon system). The error correction amount box 82 may indicate how far the object is from the origin of the X-Y axis (e.g., pattern is located 0.015 inches left of center and 0.015 inches above center). The error correction amount box 82 simply quantifies the error for the printing press 10 operator. The pattern recognition level box 84 may indicate how successful the analysis algorithm currently is recognizing the pattern (e.g., 89% recognition). The status box 86 further indicates the status of the product (e.g., good product, bad product). The run screens 70 and 72 may be further configured to include fewer or additional functions.

As previously described, the present invention can be utilized with other control systems on the printing press 10 and can be utilized when an image of the web 12 is required to be obtained.

What is claimed is:

1. A visual inspection system configured to be in optical communication with a substrate of a printing press, said visual inspection system comprising:

a CMOS image recording device configured to record images printed on the substrate, a processing unit coupled to the recording device, wherein the processing unit is configured to generate an output, and an illumination system of the non-strobe, non-incandescent type, wherein said illumination system includes a plurality of LEDs wherein said plurality of LEDs are in a circular configuration.

2. The visual inspection system of claim 1 where said circular configuration surrounds said recording device.

3. A visual inspection system configured to be in optical communication with the substrate of a printing press, said visual inspection system comprising:

a CMOS image recording device configured to record images from the substrate, a control system coupled to said recording device, wherein the control system uses the recorded image of the substrate to control operation of the printing press, and an illuminator of the non-strobe and non-incandescent type wherein said illuminator includes a plurality of LEDs wherein said LEDs are arranged in one of a rectangular and a circular configuration.

4. The visual inspection system of claim 3 wherein said configuration surrounds said recording device.

5. A visual inspection system configured to be in optical communication with the substrate of a printing press, said visual inspection system comprising:

a CMOS image recording device configured to record images from the substrate, a control system coupled to said recording device, wherein the control system uses the recorded image of the substrate to control operation of the printing press, and wherein said recording device is stationary.

6. The visual inspection system of claim 5 wherein said recording device is fixed relative to the printing press.

7. A visual inspection system configured to be in optical communication with a substrate of a printing press, said visual inspection system comprising:

a CMOS image recording device configured to record images printed on the substrate;

a control system coupled to said recording device, wherein the control system uses the recorded image to control operation of the printing press; and an illumination system including a plurality of LEDs arranged in a configuration surrounding said recording device.

8. A visual inspection system configured to be in optical communication with a web of a web offset printing press, said visual inspection system comprising:

a CMOS image recording device configured to record images printed on the web;

a control system coupled to said recording device, wherein the control system uses the recorded image to control operation of the printing press; and an illumination system including a plurality of high intensity LEDs arranged in a configuration surrounding said recording device.

9. A visual inspection system configured to be in optical communication with a substrate of a printing press, said visual inspection system comprising:

a CMOS image recording device configured to record images printed on the substrate, and a plurality of LEDs adjacent said recording device and positioned to illuminate the substrate, wherein said recording device includes a lens and wherein said LEDs are arranged in a circular orientation surrounding said lens.

10. A method of visually inspecting a web of a web offset printing press, the method comprising:

providing a camera assembly including a CMOS image recording device configured to record images printed on the web;

illuminating the web with a plurality of LEDs surrounding the CMOS recording device;

recording at least one image using the CMOS image recording device;

generating an output; and controlling an aspect of the printing press in response to said output.

11. An illumination arrangement for an image recording device on a printing press, said illumination arrangement adapted to illuminate the substrate of the printing press and comprising:

a plurality of high intensity LEDs arranged in a circular configuration surrounding the recording device.

12. A visual inspection system configured to be in optical communication with a substrate of a printing press, said visual inspection system comprising:

a plurality of CMOS image recording devices configured to record images printed on the substrate: and a processing unit coupled to each of said plurality of recording devices and adapted to process the recorded images wherein each of said plurality of recording devices is fixed relative to the printing press.

* * * * *